United States Patent [19]

Dorer, Jr. et al.

[11] Patent Number: 4,664,677

[45] Date of Patent: May 12, 1987

[54] MANGANESE AND COPPER CONTAINING COMPOSITIONS

[75] Inventors: Casper J. Dorer, Jr., Lyndhurst; Robert C. Tupa, Seven Hills, both of Ohio

[73] Assignee: The Lubrizol Corporation, Wickliffe, Ohio

[21] Appl. No.: 876,517

[22] Filed: Jun. 20, 1986

Related U.S. Application Data

[63] Continuation of Ser. No. 539,350, Oct. 5, 1983, abandoned.

[51] Int. Cl.[4] .......... C01L 1/14

[52] U.S. Cl. .......... 44/68; 44/57; 44/70

[58] Field of Search .......... 44/68, 57, 70; 539/350

[56] References Cited

U.S. PATENT DOCUMENTS

| | | | |
|---|---|---|---|
| 2,338,578 | 1/1944 | Dowing et al. | 44/68 |
| 2,560,542 | 7/1951 | Bartleson et al. | 44/68 |
| 2,622,671 | 12/1952 | Johnson | 44/68 |
| 2,695,910 | 11/1954 | Asseff et al. | 44/69 |
| 2,844,112 | 7/1958 | Muller | 44/68 V |
| 2,943,925 | 7/1960 | Ambrose | 44/68 |
| 3,348,932 | 10/1967 | Kukin | 44/57 |
| 3,481,716 | 12/1969 | Mrstik et al. | 44/68 |
| 3,701,729 | 10/1972 | Fisher et al. | 44/68 |
| 3,827,979 | 8/1974 | Piotrowski et al. | 44/57 |
| 4,162,986 | 7/1979 | Alkaitis et al. | 44/51 |
| 4,202,671 | 5/1980 | Diehl et al. | 44/58 |
| 4,225,448 | 9/1980 | Braid | 44/68 |

*Primary Examiner*—William R. Dixon, Jr.
*Assistant Examiner*—Cynthia A. Prezlock
*Attorney, Agent, or Firm*—Karl Bozicevic; Denis A. Polyn; Forrest L. Collins

[57] ABSTRACT

Disclosed are manganese and copper-containing compositions comprising:

(A) a manganese containing compound and (B) a copper containing compound, wherein said composition contains from about 0.05 up to about 23 g-atoms of manganese for each g-atom of copper in said composition. Also disclosed are fuel compositions and additive concentrates containing said manganese and copper-containing compositions. Additionally, disclosed is a method for reducing ignition temperature of exhaust particulate from diesel engines which comprises operating said engine using the above-described fuel compositions.

7 Claims, No Drawings

MANGANESE AND COPPER CONTAINING COMPOSITIONS

This is a continuation of co-pending application Ser. No. 539,350 filed on Oct. 5, 1983, abandoned.

FIELD OF THE INVENTION

This invention relates to compositions containing combinations of manganese and copper containing compounds. Typically, it relates to such compositions wherein these compounds are salts of organic acids such as carboxylic, sulfonic or phosphorus containing acids. It also relates to fuels and additive concentrates containing such compositions. Additionally, this invention relates to a method for reducing the ignition temperature of exhaust particulate from diesel engines.

BACKGROUND OF THE INVENTION

Due to an increasing concern for the environment, there is a continuing effort to reduce the pollution created by internal combustion engines. In this regard, efforts have been directed towards the reduction of particulate matter exhausted from diesel engines. One method for reducing such emissions is to place a trap or filter in the exhaust system which collects the particulate material. These traps are, however, relatively small and fill up rapidly. Cleaning of the traps can be accomplished by subjecting the trap to temperatures which decompose (burn) the collected particulate. To facilitate this process, it is advantageous that the ignition temperature of the particulate be as low as possible so that the particles start burning at the lowest possible temperatures. This lowering of ignition temperature can be accomplished by the addition of a combustion improver to the exhaust particulate. The most practical way to effect the addition of the combustion improver to the exhaust particulate is by adding the combustion improver to the fuel which when burned in the engine results in the exhaust particulate containing a combustion improver. Combustion improvers useful for this purpose are manganese or copper compounds. Manganese and copper compounds are both effective in reducing the ignition temperature of diesel engine exhaust particulate. Copper compounds, however, are more effective ignition temperature reducers than manganese compounds. While copper compounds are very effective ignition temperature improvers, their use can result in engine deposits. In accordance with the present invention, it has now been found that the ignition temperature reduction and propagation of the burning of exhaust particulate from internal combustion engines, particularly diesel engines, is improved along with a reduction in engine deposits.

DETAILED DESCRIPTION OF THE INVENTION

Basically, the invention is a composition comprising:
(A) a manganese containing compound and
(B) a copper containing compound,
wherein said composition contains from about 0.05 up to about 23 g-atoms of manganese for each g-atom of copper in said composition.

Components (A) and (B) include both organic and inorganic manganese and copper compounds and mixtures thereof. Such inorganic compounds include, for example, manganese oxides, manganese hydroxides, manganese carbonates, copper oxides, copper hydroxides and copper carbonates.

The preferred organic compounds useful for components (A) and (B) are salts of at least one organic acid. Usually at least one of (A) and (B) is a salt of an organic acid.

The organic acids used to make the salts useful as component (A) and (B) contain carbon atoms and include carboxylic acids, particularly those containing from 1 to 30 carbon atoms, sulfonic acids, particularly those containing an aromatic ring structure (e.g., benzene ring) substituted with one or more alkyl groups of 4 to about 22 carbon atoms, and phosphorus acids, containing within their structures one or more organic groups of 1 to about 30 or more carbon atoms. Preferably, the organic acid is a mixture of organic acids containing an average of at least 7 carbon atoms.

Such carboxylic, sulfonic and phosphorus acids are well known to the art. The carboxylic acids can be mono- or polycarboxylic acids (if the latter, typically they are di- or tricarboyxlic acids). Monocarboxylic acids include $C_{1-7}$ lower acids (acetic, proprionic, etc.) and higher $C_{8+}$ acids (e.g., octanoic, decanoic, etc.) as well as the well known fatty acids of about 12–30 carbon atoms. The fatty acids are often mixtures of straight and branched chain acids containing, for example, from 5 to about 30% straight chain acids and about 70 to about 95% (mole) branched chain acids. Other commercially available fatty acid mixtures containing much higher proportions of straight chain acids are also useful. Mixtures produced from dimerization of unsaturated fatty acids can also be used.

Higher carboxylic acids include the well known dicarboxylic acids made by alkylating maleic anhydride or its derivatives. The products of such reactions are hydrocarbon subsituted succinic acids, anhydrides, and the like. Lower molecular weight dicarboxylic acids, such as polymethylene bridged acids (glutaric, adipic, and the like), can also be used to make the salts of this invention as well as the lower molecular weight substituted succinic acids such as tetrapropenyl succinic acid and its analogs of to about $C_{30}$ substituted acids.

Higher molecular weight substituted succinic anhydrides, acids, and analogs useful in making the salts of this invention have been described in a number of patents, particularly those dealing with acylated compounds useful as dispersants. Typical high molecular weight acids are those made by reacting a poly(isobutene) fraction having between 30 and 400 (usually 50–250) carbon atoms with maleic anhydride. Such materials are described in U.S. Pat. Nos. 3,172,892, 3,219,666 and 3,272,746 which are incorporated by reference herein for their disclosure of high molecular weight carboxylic acids. Other monocarboxylic acids of similar molecular weight can be made by alkylating acrylic acid and its analogs. Mixtures of such acids can also be used.

The useful salts of this invention can also be made from carbocyclic carboxylic acid and even acidic hydroxy compounds such as alkylated phenols. Such materials are disclosed in U.S. Pat. No. 4,100,082, particularly columns 15–17, and these descriptions are incorporated by reference herein for such disclosure.

The sulfonic acids used to form these salts are carbocyclic or aliphatic sulfonic acids. Examples of such sulfonic acids are mahogany sulfonic acids; bright stock sulfonic acids; sulfonic acids derived from lubricating oil fraction having a Saybolt Viscosity from about 100 seconds at 100° F. to about 200 seconds at 210° F.; petrolatum sulfonic acids; mono- and polywax substituted sulfonic and polysulfonic acids of, e.g., benzene, naphthalene, phenol, diphenyl ether, naphthalene disulfide, diphenyl amine, thiophene, alpha-chloronaphthalene, etc.; other substituted sulfonic acids such as alkyl benzene sulfonic acids (where the alkyl group has at least 8 carbons), cetylphenyl mono-sulfide sulfonic acids, dicetyl thianthrene disulfonic acids, dilauryl beta-naphthyl sulfonic acids, dicapryl nitronaphthalene sulfonic acids and alkaryl sulfonic acids such as dodecylbenzene (bottoms) sulfonic acids. Dodecylbenzene (bottoms) are principally mixtures of mono- and di-dodecylbenzenes.

The aliphatic sulfonic acids include paraffin wax sulfonic acids, unsaturated paraffin wax sulfonic acids, hydroxy-substituted paraffin wax sulfonic acids, hexapropylene sulfonic acids, tetra-amylene sulfonic acids, polyisobutene sulfonic acids wherein the polyisobutene contains from 20 to 7000 or more carbon atoms chloro-substituted paraffin wax sulfonic acids, nitro-paraffin wax sulfonic acids, etc.; cycloaliphatic sulfonic acids such as petroleum naphthene sulfonic acids, cetyl cyclopentyl sulfonic acids, lauryl cyclohexyl sulfonic acids, bis-(di-isobutyl) cyclohexyl sulfonic acids, mono- or poly-wax substituted cyclohexyl sulfonic acids, etc.

Further details concerning sulfonic acids used herein can be found in U.S. Pat. Nos. 2,616,905; 3,027,325; 3,312,618; 3,350,308; 3,471,403; 3,488,284; 3,595,790; 3,798,012; 3,829,381; 4,100,083 and 4,326,972. These are hereby incorporated by reference for their disclosures in this regard.

The useful salts of this invention can be made from phosphorus acids. Such phosphorus acids have been disclosed in a number of U.S. patents and other literature. Exemplary of the former is U.S. Pat. No. 4,191,658 which discloses phosphorus acid salts of the formula

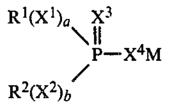

wherein M is Cu or Mn or mixtures thereof; each $R^1$ and $R^2$ is a hydrocarbon radical; each of $X^1$, $X^2$, $X^3$ and $X^4$ is oxygen or sulfur; and each of a and b is 0 or 1.

The salts made from organic acids can be prepared by reacting the organic acid with manganese or copper compounds such as manganese oxide, manganese hydroxide, manganese carbonate, cupric oxide, cupric hydroxide and cupric carbonate. These methods are well known to one of ordinary skill in the art and further discussion herein is unnecessary.

Typically, the organic acids used to make the salts of this invention are carboxylic acid, sulfonic acid, or mixtures thereof. Furthermore, components (A) and (B) can contain other metals in addition to manganese and copper. In addition, the compositions of this invention may be a single compound containing both manganese and copper.

A particularly preferred group of salts are the overbased salts. Overbased salts are those salts of organic acids wherein they contain more than sufficient metal to neutralize the acid present. In other words, they contain in excess of one equivalent of metal per equivalent of acid derived moiety. Such salts are known to the art. For disclosures on overbasing in general, see, for example, U.S. Pat. Nos.: 3,827,979 to Piotrowski et al., 3,312,618 to LeSuer et al., 2,616,904 and 2,616,905 to Asseff et al., 2,595,790 to Norman et al., and 3,725,441 to Murphy et al. For specific disclosures of overbased manganese and copper salts of organic acids see for example, U.S. Pat. Nos. 2,695,910 and 4,162,987. These patents are hereby incorporated by reference for their disclosures of overbased salts of organic acids and their methods of preparing such salts.

In particular, this invention relates to manganese and copper salts of organic acids which are hydrocarbon-soluble, highly overbased manganese and/or copper metal organic compositions comprising manganese and/or copper metal oxide-hydroxide-carboxylate complex wherein the metal content is in chemical combination partly with oxygen in a polynuclear metal oxide crystallite core and partly with at least two different monocarboxylic acids or a mixture of one or more monocarboxylic and monosulfonic acids containing at least two carbon atoms as hydroxyl-metal-carboxylate and hydroxyl-metal-sulfonate groups, at least one of the acids being a monocarboxylic acid containing at least seven carbon atoms, and when the second acid is also a monocarboxylic acid, the second acid contains a number of carbon atoms in its longest chain differing by at least two carbon atoms from the total number of carbon atoms in the other, at least a portion of the carboxylate and sulfonate groups being hydrogen bonded to oxygen atoms of the core, and the remainder of the carboxylate and sulfonate groups are unbonded and in equilibrium with the bonded groups, and the ratio of total metal moles to the total moles of organic acid is greater than one. These preferred compositions and their method of preparation are described in more detail in U.S. Pat. No. 4,191,658 which is hereby incorporated by reference for its disclosure in this regard.

The compositions of this inention are preferably those which are hydrocarbon soluble. As used in the specification and the appended claims, the term "hydrocarbon soluble" is intended to mean that the compositions are soluble or stably dispersible in normally liquid hydrocarbon. The term "stably dispersible" as used in the specification and the appended claims is intended to mean that the composition is capable of being dispersed in the liquid hydrocarbon medium to an extent which allows it to function in its intended manner. Thus, for example, a composition is hydrocarbon soluble if it is capable of being suspended in fuel oil in a manner sufficient to allow the fuel to function as a fuel.

The combination of materials (A) and (B) can be effected in any convenient manner and as previously mentioned compounds having a combination of manganese and copper contained therein can be used as both (A) and (B). The amount of (A) and (B) used in the manganese and copper containing compositions is usually such that said composition contains from about 0.05 up to about 23 g-atoms, preferably, from about 2 up to about 23 and, more preferably, from about 4 up to about 20 g-atoms of manganese for each g-atom of copper in said composition.

The invention also contemplates the use of other additives in combination with (A) and (B). Such additives include, for example, detergents and dispersants of the ash-producing or ashless type.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature about 50° C. and filtering the resulting mass. The use of a "promoter" in the neutralization step to aid the incorporation of a large excess of metal likewise is known. Examples of compound useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-β-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°-200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricant compositions of this invention. The following are illustrative:

(1) Reaction products of carboxylic acids (or derivatives thereof) containing at least about 30 and preferably at least about 50 carbon atoms with nitrogen containing compounds such as amine, organic hydroxy compounds such as phenols and alcohols, and/or basic inorganic materials. Examples of these "carboxylic dispersants" are described in British Pat. No. 1,306,529 and in many U.S. patents including the following:

| | | |
|---|---|---|
| 3,163,603 | 3,351,552 | 3,541,012 |
| 3,184,474 | 3,381,022 | 3,543,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | 4,234,435 |
| 3,346,493 | 3,522,179 | Re 26,433 |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. patents are illustrative:

| | | |
|---|---|---|
| 2,459,112 | 3,442,808 | 3,591,598 |
| 2,962,442 | 3,448,047 | 3,600,372 |
| 2,984,550 | 3,454,497 | 3,634,515 |
| 3,036,003 | 3,459,661 | 3,649,229 |
| 3,166,516 | 3,461,172 | 3,697,574 |
| 3,236,770 | 3,493,520 | 3,725,277 |
| 3,355,270 | 3,539,633 | 3,725,480 |
| 3,368,972 | 3,558,743 | 3,726,882 |
| 3,413,347 | 3,586,629 | 3,980,569 |

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,422 |

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-subsituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The ash and ashless detergents and dispersants described hereinabove are generally used in an amount such that for each part by weight of (A) and (B) combined there is from about 0.01 up to about 10, preferably from about 0.05 up to about 5, parts by weight of such detergents or dispersants.

As previously mentioned, the compositions of the present invention are useful as additives for fuels. Generally, these fuel compositions comprise a major amount of fuel and a minor amount of the manganese and copper-containing compositions of the present invention.

The term "minor amount" as used in the specification and appended claims is intended to mean that when a composition contains a "minor amount" of a specific material that amount is less than 50% by weight of the composition.

The term "major amount" as used in the specification and appended claims is intended to mean that when a composition contains a "major amount" of a specific material that amount is more than 50% by weight of the composition.

Typically, the amount of the manganese and copper-containing compositions of this invention used in the treating of the fuel compositions of the present invention is such that the treated lubricant fuel compositions have a combined manganese and copper content of about 1-1000, preferably 5-350 ppm (by weight). In distillate fuel oils, particularly, the fuel compositions have a combined manganese and copper content of about 1-500, preferably 10-250 ppm (by weight).

The fuels treated with the compositions of this invention include both solid and normally liquid fuels. Among the solid fuels are coal, shale, peat, wood, organic refuse, charcoal and the like.

The normally liquid fuel compositions of this invention are generally derived from petroleum sources, e.g., normally liquid petroleum distillate fuels, though they may include those produced synthetically by the Fischer-Tropsch and related processes, the processing of organic waste material or the processing of coal, lignite or shale rock. Such fuel compositions have varying boiling ranges, viscosities cloud and pour points, etc., according to their end use as is well known to those of skill in the art. Among such fuels are those commonly known as motor gasoline, distillate fuel oils, residual fuel oils, etc. The properties of such fuels are well known to skilled artisans as illustrated, for example, by ASTM Specifications D396 (Fuel Oils), D975 (Diesel Fuel Oils) and D439 (Gasolines) available from the American Society for Testing Materials, 1916 Race Street, Philadelphia, Pa. 19103.

The fuel compositions of this invention can contain, in addition to the products of this invention, other additives which are well known to those of skill in the art. These can include anti-knock agents such as tetraalkyl lead compounds, lead scavengers such as haloalkanes, dyes, cetane improvers, anti-oxidants such as 2,6-di-tertiary-butyl-4-methylphenol, rust inhibitors, such as alkylated succinic acids and anhydrides, bacteriostatic agents, gum inhibitors, metal deactivators, upper cylinder lubricants, demulsifiers and the like.

The manganese and copper containing compositions of this invention can be added directly to the fuel to form the fuel compositions of this invention or they can be diluted with a substantially inert, normally liquid organic solvent/diluent such as mineral oil, xylene, or a normally liquid fuel as described above, to form an additive concentrate which is then added to the fuel in sufficient amounts to form the invention fuel composition described herein. These concentrates generally contain about 10 to 99 percent of the compositions of this invention and can contain in addition any of the above-described conventional additives, particularly the aforedescribed ashless dispersants in the aforesaid proportions. The remainder of the concentrate is the solvent/diluent.

This invention is exemplified in the following examples. Of course, these examples are not intended as limiting this invention as modification of the examples by ordinary expedient will be readily apparent to those of ordinary skill in the art.

In all examples, unless ottherwise stated, all parts are parts by weight and all percentages are derived from parts by weight.

EXAMPLE I

A composition is prepared by combining 1. 993 parts—an overbased manganese carboxylate (containing 40% by weight manganese) commerically available from Mooney Chemical Company as Mooney 910;
2. 822 parts—a copper carboxylate (containing 12% by weight copper) commercially available from Mooney Chemical Company as Mooney Copper Cem-All;
3. 16.5 parts—an ethoxylated/propoxylated hydroxy demulsifier compound commercially available from Tretolite Division of Petrolite Corporation as Tolad 285;
4. 12.8 parts—an ethoxylated/propoxylated pentaerythritol demulsifier commercially available from Nalco Chemical as Nalco 5RD-648;
5. 1324 parts—an ashless acylated nitrogen-containing dispersant prepared by reacting a mixture of poly(isobutene) substituted succinic anhydride acylating agent (having a substituent with an Mn equal to about 1,000) with a commercial mixture of ethylene polyamines averaging in composition triethylene tetramine; and
6. 6831 parts—an aromatic solvent having a kauri gum-butenol value of 95.

The above combination is prepared by first combining components 1 through 4 which are then added to the combinaton of components 5 and 6.

EXAMPLE II

A composition is prepared by combining 1. 796 parts—an overbased manganese carboxylate (containing 40% by weight manganese) commercially available from Mooney Chemical Company as Mooney 910;
2. 2636 parts—a copper carboxylate (containing 12% by weight copper) commercially available from Mooney Chemical Company as Mooney Copper Cem-All;
3. 13.2 parts—an ethoxylated/propoxylated hydroxy demulsifier compound commercially available from Tretolite Division of Petrolite Corporation as Tolad 285;
4. 10.3 parts—an ethoxylated/propoxylated pentaerythritol demulsifier commercially available from Nalco Chemical as Nalco 5RD-648;
5. 1063 parts—an ashless acylated nitrogen-containing dispersant prepared by reacting a mixture of poly(isobutene) substituted succinic anhydride acylating agent (having a substituent with an Mn equal to about 1,000) with a commercial mixture of ethylene polyamines averaging in composition triethylene tetramine; and
6. 5481 parts—an aromatic solvent having a kauri gum-butenol value of 95.

The above combination is prepared by first combining components 1 through 4 which are then added to the combination of components 5 and 6.

EXAMPLE III

A composition is prepared by combining 1. 1068 parts—an overbased manganese carboxylate (containing 40% by weight manganese) commercially available from Mooney Chemical Company as Mooney 910;
2. 122 parts—finely divided cupric oxide;
3. 17.7 parts—an ethoxylated/propoxylated hydroxy demulsifier compound commercially available from Tretolite Division of Petrolite Corporation as Tolad 285;
4. 13.8 parts—an ethoxylated/propoxylated pentaerythritol demulsifier commercially available from Nalco Chemical as Nalco 5RD-648;
5. 1425 parts—an ashless acylated nitrogen-containing dispersant prepared by reacting a mixture of poly(isobutene) substituted succinic anhydride acylating agent (having a substituent with a Mn equal to about 1,000) with a commercial mixture of ethylene polyamines averaging in composition triethylene tetramine; and
6. 7352 parts—an aromatic solvent having a kauri gumbutenol value of 95.

The above combination is prepared by first combining components 1 through 4 which are then added to the combination of components 5 and 6.

EXAMPLE IV

A composition is prepared by combining 1. 435 parts—finely divided manganese dioxide;
2. 79.5 parts—finely divided cupric oxide;
3. 171 parts—an ashless acylated nitrogen-containing dispersant prepared by reacting a mixture of poly(isobutene) substituted succinic anhydride acylating agent (having a substituent with an Mn equal to about 1,000) with a commercial mixture of ethylene polyamines averaging in composition triethylene tetramine; and
4. 2744 parts—an aromatic solvent having a kauri gumbutenol value of 95.

The above combination is prepared by first combining components 1 through 4 which are then added to the combination of components 5 and 6.

EXAMPLE V

A composition is prepared by combining 1. 352 parts—an overbased manganese carboxylate (containing 40% by weight manganese) commercially available from Mooney Chemical Company as Mooney 910;
2. 6745 parts—a copper carboxylate (containing 12% by weight copper) commercially available from Mooney Chemical Company as Mooney Copper Cem-All;

EXAMPLE VI

A gasoline composition having a Reid vapor pressure of 8.4 PSI containing 120 parts per million parts of the gasoline of the composition described in Example I.

EXAMPLE VII

A diesel fuel oil (No. 1 distillate oil as defined in ASTM D 975) containing 780 parts per million parts of fuel of the composition described in Example I.

EXAMPLE VIII

A diesel fuel oil (No. 2 distillate oil as defined in ASTM D 975) containing 1560 parts per million parts of fuel of the composition described in Example I.

EXAMPLE IX

A diesel fuel oil (No. 4 fuel oil as defined in ASTM D 975) containing 3110 parts per million parts of fuel of the composition described in Example I.

EXAMPLE X

A residual fuel oil (No. 5 (light) fuel oil as defined in ASTM D 396) containing 4370 parts per million parts of fuel of the composition described in Example I.

EXAMPLE XI

A diesel fuel oil (No. 2 distillate fuel oil as described in ASTM D 975) containing 2420 parts per million parts of fuel of the composition described in Example II.

EXAMPLE XII

A diesel fuel oil (No. 2 distillate fuel oil as described in ASTM D 975) containing 1770 parts per million parts of fuel of the composition described in Example III.

EXAMPLE XIII

A diesel fuel oil (No. 2 distillate fuel oil as described in ASTM D 975) containing 930 parts per million parts of fuel of the composition described in Example IV.

EXAMPLE XIV

A diesel fuel oil (No. 2 distillate fuel oil as described in ASTM D 975) containing 970 parts per million parts of fuel of the composition described in Example V.

This invention also relates to a method for reducing the ignition temperature of exhaust particulate from diesel engines which comprises operating said engine using the above-described fuels.

Fuel compositions of the present invention have been used as fuel in the operation of diesel engines and resulted in exhaust particulate having reduced ignition temperatures.

What is claimed is:

1. A method of reducing exhaust particulate build up in a diesel engine exhaust system trap, comprising including within a major amount of diesel fuel a minor amount of a composition comprising a hydrocarbon soluble manganese containing salt of an organic acid and a hydrocarbon soluble copper containing salt of an organic acid wherein the composition contains from about 0.05 to about 23 g-atoms of manganese for each g-atom of copper and the ratio of total metal moles to total moles of organic acid is greater than one so that the composition as a whole is overbased, and supplying the diesel fuel containing the composition to a diesel engine which engine includes an exhaust system and a particulate trap in the engine's exhaust system.

2. The method of reducing exhaust particulate build up as claimed in claim 1 wherein the organic acid is selected from the group consisting of a carboxylic acid, phosphorus acid, sulfonic acid and mixtures thereof.

3. The method of reducing exhaust particulate build up as claimed in claim 1 wherein the composition contains from about 2 to about 23 g-atoms of manganese for each g-atom of copper in the composition.

4. The method of reducing exhaust particulate build up as claimed in claim 1 wherein the manganese containing salt and the copper containing salt are each overbased salts of a sulfonic acid containing 1 to 30 carbon atoms.

5. The method of reducing exhaust particulate build up as claimed in claim 1 wherein the manganese containing salt and the copper containing salt are each overbased salts of dicarboxylic acids made by alkylating maleic anhydride or its derivatives with a poly(isobutene) containing between 30 and 400 carbon atoms.

6. The method of reducing exhaust particulate build up as claimed in claim 5 wherein the composition is included in the diesel fuel in an amount so as to provide a combined manganese and copper content in the range of about 5 to 350 ppm by weight based on the total combined weight of the diesel fuel and composition.

7. The method of reducing exhaust particulate build up as claimed in claim 1 wherein the organic acid is a mixture of fatty acids containing about 12 to about 30 carbon atoms with the mixture containing from about 5% (mole) to about 30% (mole) straight chain acids and from about 70% (mole) to about 95% (mole) branched chain acids.

* * * * *